No. 834,938. PATENTED NOV. 6, 1906.
E. SANDBERG.
TENONING MACHINE.
APPLICATION FILED MAR. 23, 1906.

3 SHEETS—SHEET 1.

Witnesses:
Chas. W. LaRue
F. M. Donsbach

Inventor:
Emil Sandberg
by Phillips Abbott
Attorney.

No. 834,938. PATENTED NOV. 6, 1906.
E. SANDBERG.
TENONING MACHINE.
APPLICATION FILED MAR. 23, 1906.

3 SHEETS—SHEET 2.

Witnesses:
Chas. W. LaRue
J. M. Donsbach

Inventor:
Emil Sandberg
by Phillips Abbott
Attorney.

No. 834,938. PATENTED NOV. 6, 1906.
E. SANDBERG.
TENONING MACHINE.
APPLICATION FILED MAR. 23, 1906.

3 SHEETS—SHEET 3.

Witnesses:
Chas. W. LaRue
F. M. Dousbach

Inventor:
Emil Sandberg
by Phillips Abbott
Attorney

UNITED STATES PATENT OFFICE.

EMIL SANDBERG, OF NEW YORK, N. Y., ASSIGNOR OF ONE-HALF TO WILLIAM H. ANDERSON, OF BROOKLYN, NEW YORK.

TENONING-MACHINE.

No. 834,938.     Specification of Letters Patent.     Patented Nov. 6, 1906.

Application filed March 23, 1906. Serial No. 307,623.

*To all whom it may concern:*

Be it known that I, EMIL SANDBERG, a subject of the King of Sweden, and a resident in the borough of Brooklyn, county of Kings, city and State of New York, have invented certain new and useful Improvements in Tenoning-Machines, of which the following is a specification, reference being had to the accompanying drawings, in which—

Figure 1:
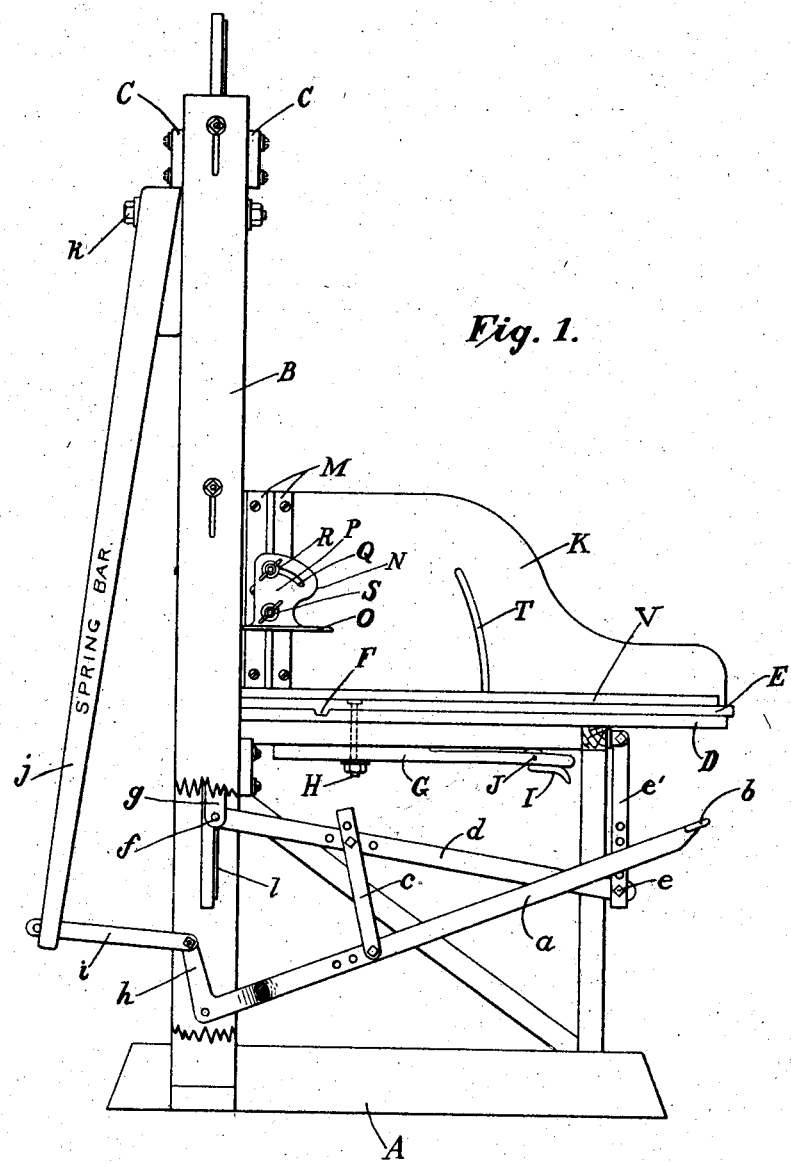
Figure 2:
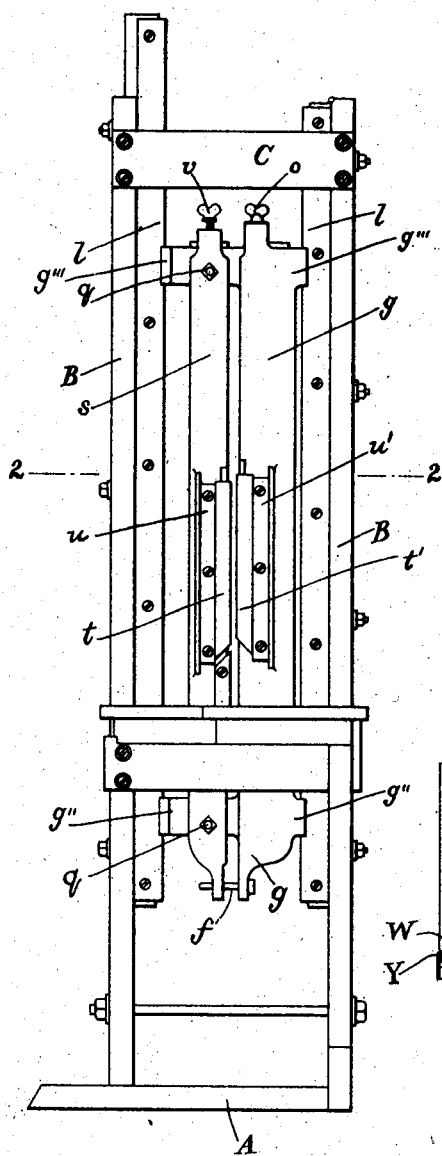
Figure 5:
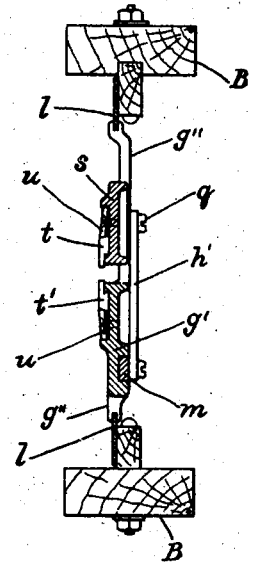
Figure 6:
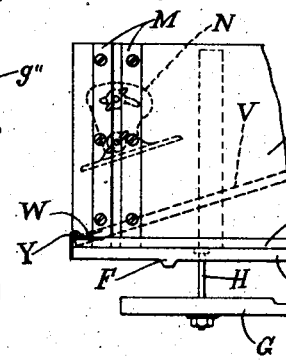
Figure 7:
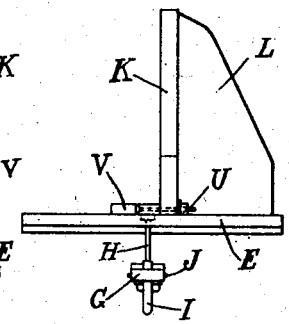
Figure 3:
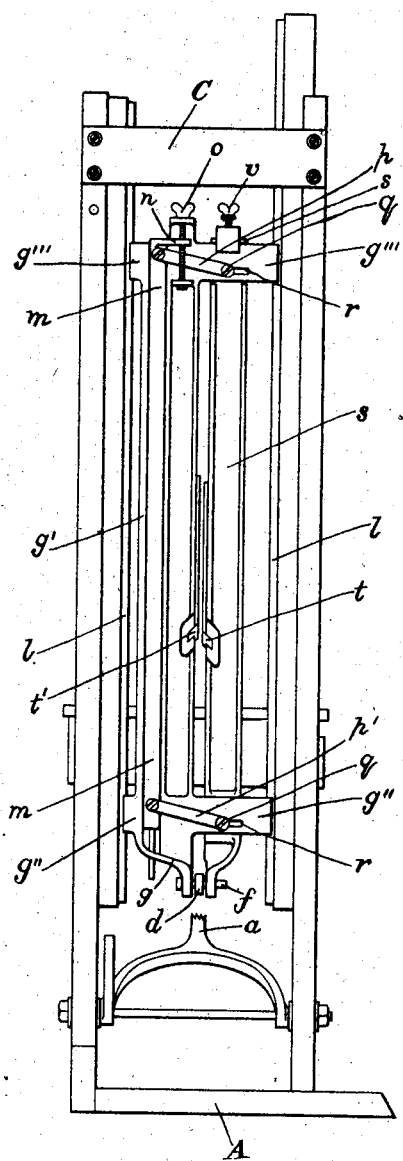
Figure 4:
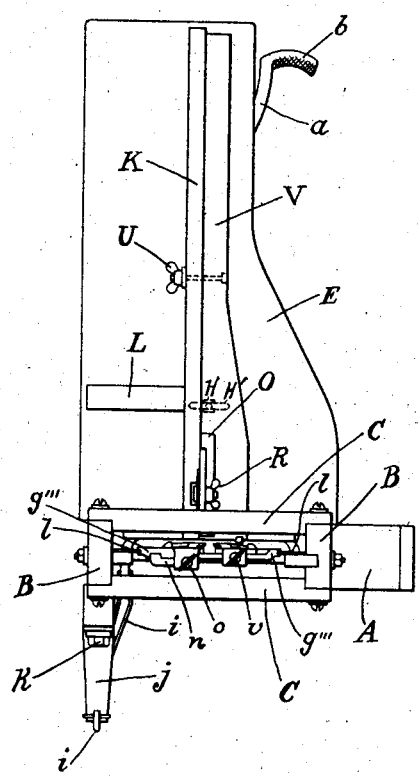

Figure 1 illustrates a side elevation of one form of machine embodying the invention. Fig. 2 illustrates a front elevation of that which is shown in Fig. 1, certain of the parts being omitted for ease of understanding. Fig. 3 illustrates a rear elevation of the machine shown in Fig. 1, certain of the parts being omitted for clearness in understanding. Fig. 4 illustrates a plan view of that which is shown in Fig. 1. Fig. 5 illustrates a horizontal sectional view on the line 2 2 of Fig. 2. Fig. 6 illustrates a detail showing part of the adjustable guide upon the table of the machines as seen from the side. Fig. 7 illustrates a view similar to that shown in Fig. 6 as seen from the front end of the table.

The essentials of the invention may be embodied in machines or apparatus of a variety of constructions so far as the details are concerned.

The machine illustrated in the drawings and about to be described is a good and practical embodiment well adapted to use in carpenter-shops and woodworking factories generally, because of its ready adaptation to the cutting of tenons of all sizes in stock of all widths and at all desired angles.

A represents a suitable base or support for the machine. B B are two uprights. They are suitably connected with the base at the lower end, and C is a cross-bar which supports their upper ends.

D is the table proper of the machine. It is immovably fastened to the frame thereof. E (see Figs. 1, 6, and 7) is what may be called an "upper" leaf of the table. It is adapted to be moved laterally across the table proper, D, and in this movement it will be guided by the rib F, (see Fig. 1,) which slides in a corresponding groove made in the table proper, D. The leaf E and the parts carried by it, which will be shortly described, are clamped in position by a clamp-bar G and coacting bolt H.

The bolt (see Figs. 6 and 7) passes upwardly through the table proper, D, and engages in a transverse slot H', made in the movable table-leaf E, as shown.

I is a cam-lever pivoted at J in a slot made near the end of the clamp-bar G, whereby upon its appropriate operation the clamp-bar will exert strain upon the bolt H, clamping the movable leaf E in its then position.

K is a lateral guide or stop for the work. It is set at right angles to the movable leaf E and is supported at its rear side by a brace L and is provided on its front face with slideways M, in which a work-confiner N operates. This confiner is a metallic structure comprising a horizontal flange-like part O and a vertical web-like part P. In the latter there is a grooved slot Q, in which a set-screw R works, whereby it can be adjusted at any desired inclination relative to the horizon. There is another set-screw S, which acts as a fulcrum or pivot upon which the device tilts. It will be noted that the entire structure may be moved vertically through the slideway M by loosening both the screws. The lateral work-guide K is also provided with a slot T, through which a bolt U (see Fig. 4) works. This bolt U aids in holding the part V, which I call the "work-ledge" because the work rests edgewise upon it. It is adapted to any desired inclined position by reason of the bolt U, which confines it, working through the slot T in the lateral guide K. The front end of the ledge V is provided with a metallic plate W, (see Fig. 6,) which fits under an overhanging hook-like structure Y, whereby the ledge V is permitted to have the tilting movement above stated, yet is accurately held in position. The front edge of the plate W on the ledge V lies close to the plane of travel of the knives hereinafter to be described, giving suitable support to the stock.

The knives or cutters are arranged to reciprocate vertically, although they may be otherwise arranged, if desired. Their construction and that of the mechanism which actuates them is as follows:

*a* is a pedal-lever provided with a foot-piece *b*. *c* is a link connecting the pedal-lever with a bar *d*, which is adjustably pivoted at one end, as at *e*, to a pendent swingable link *e'*, and at the other end, as at *f*, to a sliding frame $g$, which carries the knives. The pedal-lever has a bell-crank terminal $h$, which connects with a link $i$, which in turn engages with a spring-bar $j$, which is rigidly confined at its upper end, as by a bolt $k$, whereby the lever is normally elevated and the parts returned to their primary position. It will be noted that the links $c$ and $d$ are provided with adjusting-holes.

The frame $g$ is of peculiar construction. It embodies a side piece $g'$ and two horizontal pieces $g''$ and $g'''$, which may be called "cross-heads." The extremities of these cross-heads properly engage with and slide vertically upon slideways $l$. $m$ is a bar (see Figs. 3 and 5) set in a recess in the part $g'$ of the frame and which is adapted to vertical adjustment therein by means of a rectangular and horizontally-extending stud $n$, (see Fig. 3,) which engages with a suitably-supported and threaded spindle $o$, so that when the spindle is turned the bar $m$ will be moved upwardly and downwardly through the groove made in the part $g'$.

$p$ $p'$ are two links pivoted at one end, as shown, to the vertically-moving bar $m$ and at the other end provided with a screw or bolt $q$, which passes through a slot $r$, made in the cross-heads $g''$ $g'''$, respectively, and they engage with a laterally-movable knife-holding bar $s$. (See Figs. 3 and 5.)

$t$ $t'$ (see Fig. 5) are the cutters, which are held by clamp-plates $u$ $u'$, provided with screws, as shown, to the bar $g'$ and to the laterally-adjustable bar $s$.

$v$ is a thumb-screw for the threaded spindle, of which it forms a part, adapted to press upon the upper end of the laterally-adjustable bar $s$, whereby it is clamped in position by the pressure of the screw at its upper end and by the forcing of its lower end against the cross-head $g''$.

It will be noted that by reason of the construction described the knives are adapted to any desired adjustment—that is to say, when the knives are to be brought closer together to cut a narrow tenon, the thumb-screw $o$ being turned in the appropriate direction, the bar $m$ will be elevated, whereupon the links $p$ will be caused to approach more and more to a vertical position, resulting in the drawing in of the laterally-movable blade-carrying bars $s$. Of course the thumb-screw $v$ will have been loosened prior to the attempt to make this adjustment. When the bar $s$ has reached the proper distance from the fixed bar $g'$, the thumb-screw $v$ will be again set up hard, whereby the movable bar $s$, carrying its blade $t$, may be clamped in its then position. Thereupon the table and the work-controlling guides and stops thereon being adjusted in accordance with the then position of the knives, a tenon of the desired size and located as desired upon the stock will be cut by the knives when pressure is applied upon the treadle, which, through its obvious operation, will cause the knives to descend, shearing across the end of the stock, which is presented to the knives at such angle as may be desired, thus cutting the tenon thereon.

If now it be desired to make a wider tenon, the thumb-screw $o$ is manipulated in such manner as to cause the sliding bar $m$ to descend, whereupon the links $p$ $p'$ will be caused to approach nearer to a horizontal position, which will result in shifting the adjustable bar $s$, carrying its blade $t$ laterally or away from the other blade $t'$, thus widening the distance between them, and consequently the width of the tenon that they will cut.

It will be noted that by reason of the various adjustments embodied in the machine and above described it is possible to cut tenons upon stock of varying widths and at any desired angle on the stock, and, furthermore, that the tenons themselves may be of any desired width and length and that they may be located upon the stock at any desired place.

It will be obvious to those who are familiar with this art that modifications may be made in the details of construction of the mechanism without departing from the essentials of the invention. I therefore do not limit myself to the details.

I claim—

1. In a machine of the class stated the combination of suitable knives adjustable relative to each other, means to reciprocate the knives, a work-supporting ledge adjustable at any desired angle relative to the knives, a vertically and angularly adjustable work-confiner and a table which supports the ledge and work-confiner and which is laterally adjustable relative to the knives.

2. In a machine of the class stated, the combination of a vertically-sliding frame embodying a fixed knife and knife-supporting bar, a movable bar, a laterally-movable knife and knife-bar, links connecting the movable bar with the laterally-movable knife-bar, means to support the work, means to reciprocate the knives and means to automatically return the knives to normal or primary position.

3. In a machine of the class stated, the combination of a vertically-sliding frame, a fixed knife-bar, a movable bar, a laterally-movable knife-bar, knives for said knife-bars, parallel and equal length links connecting the movable bar with the laterally-movable knife-bar at both of its ends, means to move and hold the movable bar, means to support the work, means to reciprocate the knives and means to automatically return the knives to normal or primary position, the knives being arranged to cut across the grain and not shave with the grain.

4. In a machine of the class stated the combination of suitable knives, means to reciprocate the knives, a table provided with an upper laterally-movable leaf, a work-supporting ledge adjustable at any desired angle relative to the knives and a vertically and angularly adjustable work-confiner carried by the movable leaf.

In testimony whereof I have signed my name to this specification in the presence of two subscribing witnesses.

EMIL SANDBERG.

Witnesses:
PHILLIPS ABBOTT,
F. M. DONSBACH.